(12) United States Patent
Lavian et al.

(10) Patent No.: US 7,433,941 B1
(45) Date of Patent: Oct. 7, 2008

(54) METHOD AND APPARATUS FOR ACCESSING NETWORK INFORMATION ON A NETWORK DEVICE

(75) Inventors: Tal Isaac Lavian, Sunnyvale, CA (US); Robert James Duncan, San Francisco, CA (US)

(73) Assignee: Nortel Networks Limited, St. Laurent, Quebec (CA)

( * ) Notice: Subject to any disclaimer, the term of this patent is extended or adjusted under 35 U.S.C. 154(b) by 0 days.

(21) Appl. No.: 09/522,332

(22) Filed: Mar. 9, 2000

Related U.S. Application Data

(60) Provisional application No. 60/124,047, filed on Mar. 12, 1999.

(51) Int. Cl.
*G06F 15/16* (2006.01)
(52) U.S. Cl. .............. 709/223; 709/201; 709/203; 709/218; 709/219; 709/220; 709/221; 709/222; 709/224
(58) Field of Classification Search ............ 709/201, 709/202, 218–224, 203
See application file for complete search history.

(56) References Cited

U.S. PATENT DOCUMENTS

| | | | | |
|---|---|---|---|---|
| 5,655,081 A | * | 8/1997 | Bonnell et al. ............... | 709/202 |
| 5,958,010 A | * | 9/1999 | Agarwal et al. .............. | 709/224 |
| 6,085,240 A | * | 7/2000 | Suzuki et al. ................ | 709/223 |
| 6,112,225 A | * | 8/2000 | Kraft et al. ................... | 709/224 |
| 6,122,664 A | * | 9/2000 | Boukobza et al. ........... | 709/224 |
| 6,182,157 B1 | * | 1/2001 | Schlener et al. ............. | 709/224 |
| 6,272,537 B1 | * | 8/2001 | Kekic et al. .................. | 709/223 |
| 6,349,333 B1 | * | 2/2002 | Panikatt et al. .............. | 709/223 |
| 6,363,421 B2 | * | 3/2002 | Barker et al. ................. | 709/223 |
| 6,405,250 B1 | * | 6/2002 | Lin et al. ...................... | 709/224 |
| 6,434,594 B1 | * | 8/2002 | Wesemann ................... | 709/201 |
| 6,466,974 B1 | * | 10/2002 | Nelson et al. ................ | 709/223 |
| 6,539,425 B1 | * | 3/2003 | Stevens et al. ............... | 709/220 |

OTHER PUBLICATIONS

Susilo et al. "Infrastructure for Advanced Network Management Based on Mobile Code." IEEE, 1998. pp. 322-333.*
Covaci et al. "Java-Based Intelligent Mobile Agents for Open System Management." IEEE, 1997. pp. 492-501.*
Liotta et al. "Modelling Network and System Monitoring Over the Internet With Mobile Agents." IEEE, 1998. pp. 303-312.*

* cited by examiner

*Primary Examiner*—Nathan Flynn
*Assistant Examiner*—Alina N. Boutah
(74) *Attorney, Agent, or Firm*—Anderson Gorecki & Manaras LLP

(57) ABSTRACT

A computer-implemented method and system of distributing management of network resources on a network to network devices is provided. During execution, the system receives a request on a network device to execute a task that performs a set of operations related to managing the network, receives an application over the network wherein the application includes operations for performing the task, processes operations on the network device that requests network parameters from a remote network device, transmits the request for the network parameter over the network to the remote network, and receives the requested network parameter over the network from the remote network device.

32 Claims, 6 Drawing Sheets

METHOD AND APPARATUS FOR ACCESSING NETWORK INFORMATION ON A NETWORK DEVICE

This application claims priority from U.S. Provisional Application No. 60/124,047, filed Mar. 12, 1999.

TECHNICAL FIELD

This invention generally relates to network management and, more particularly, to a method and apparatus for accessing network information on a network of intelligent network devices.

BACKGROUND

Computer networks are becoming increasingly complex and difficult to manage. This is driven in part by the ever-increasing variety of network devices, computers, and software being combined together to integrate large enterprise-based intranets with the Internet. Network management tools have been produced to monitor these complex combinations of hardware and software and help troubleshoot network failures when they occurred.

Traditional network management tools use a protocol called simple network management protocol (SNMP) to monitor network devices such as routers, switches, hubs, remote access devices, or even computers in a network. The protocol used to interface with SNMP includes rudimentary commands to operate on data such as to "get" a variable, "set" a variable, or "test" a variable. These commands typically are deployed from a central network management server (NMS) within the network to a network device connected to the network. The network device processes one or more of these rudimentary commands and then returns the results to the NMS for further processing and analysis. In these systems, little or no processing or analysis is performed by the network devices. Instead, the NMS is saddled with the responsibility of receiving the results as well as performing the complex analyses associated with monitoring network operation and performance.

SUMMARY

In one aspect of the present invention, a system for managing network resources includes a network device operatively connected to the network having a processor capable of downloading a task over the network, executing the task, and providing the results from the task. In addition, a network management server requests that the network device execute a task related to the management of resources associated with the network and receives the results from the task for use in management of the network.

In another aspect of the invention, a computer-implemented method of distributing management of network resources on a network to network devices includes receiving a request on a network device to execute a task that performs a set of operations related to managing the network, receiving an application over the network wherein the application includes operations for performing the task, processing operations on the network device that requests network parameters from a remote network device, transmitting the request for the network parameter over the network to the remote network, and receiving the requested network parameter over the network from the remote network device.

These network management systems and methods have one or more of the following advantages. For example, the network management system (NMS) can operate more efficiently even on complex networks with high amounts of network traffic. Instead of performing tasks centrally, the tasks are distributed to many different network nodes connected to the network. This reduces the amount of status information sent between the network nodes and the NMS because the processing is done locally on each network node. Each network device sends the results of a specific task back to the NMS rather than transmitting numerous status packets. Accordingly, this reduces the bandwidth required for most network management tasks and increases response time even during a peak traffic period on the network.

For example, a traditional SNMP network command requires at least two network transmissions to gather each network parameter. A first transmission carries a request from the central NMS over the network to the network node with the requested network parameter. The second transmission carries a reply having the network parameters or status over the network from the network node back to the central NMS. Using the systems and methods described herein, numerous commands can be executed on a network node before a response is supplied to the NMS.

The details of one or more embodiments of the invention are set forth in the accompanying drawings and the description below. Other features, objects, and advantages of the invention will be apparent from the description and drawings, and from the claims.

DESCRIPTION OF DRAWINGS

The accompanying drawings, which are incorporated in and constitute a part of this specification, illustrate an embodiment of the invention and, together with the description, serve to explain the advantages and principles of the invention.

DETAILED DESCRIPTION

Systems and methods described herein are used to distribute network management tasks to one or more network devices connected to a network. A network application distributed to each network device collects relevant network parameters from each network device and transmits the results back to a central NMS or to other network devices on the network for further analysis. Each network application can be programmed to perform a series of complex operations using an object-oriented programming language such as Java. The network application interfaces on each network device provides an application programming interface (API) compatible with the particular programming language. This API is compatible with legacy network management protocols such as simple network management protocol (SNMP) and, therefore, can be adapted to work with a wide range of legacy compatible devices.

Tools used to generate the API consistent with the present invention include a management information database (MIB) to object-oriented software compiler and a MIB map. The compiler uses existing MIB information to generate an object oriented MIB interface to the underlying MIB information collected on each network device. The compiler also generates a MIB map to determine if access to the MIB information is made directly to the storage location of the MIB database or through a network address and network management protocol associated with the network device.

Figure 1:
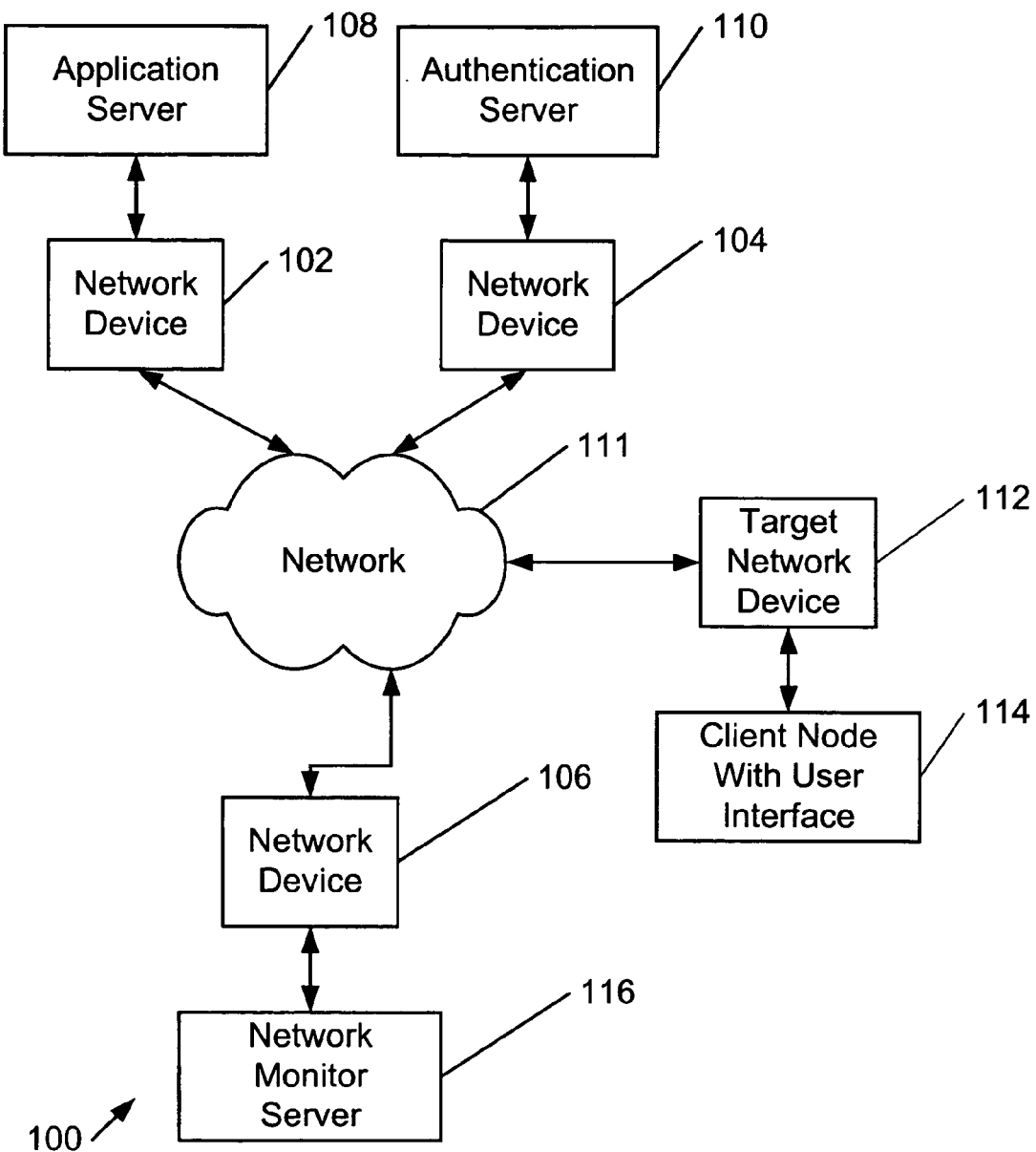
FIG. 1 is a block diagram of a network.

FIG. 1 illustrates an exemplary communication system 100 including a network device 102, a network device 104, a network device 106, and a target network device 112. Network devices 102, 104, 106, and target network device 112 may be any device capable of processing fixed-length or variable-length packets in a network, including switches, routers, hubs, computers and the like.

Network device 102 facilitates the transfer of applications from an application server 108 to the other network devices and nodes on the network. Server 108 provides applications that can execute directly on network devices 102-106 and target network device 112. The variety of network applications available for downloading from application server 108 increases the network management capabilities of each network device. For example, application server 108 may provide an application to a network device that enables the device to filter network traffic containing data packets generated from activities not critical to business, such as browsing the Internet. The resulting increase in bandwidth can be used for more critical business needs.

Network device 104 enables authentication server 110 to authenticate downloading of applications from application server 108 to other network devices within communication system 100. Authentication server 110 can identify a network device on the network and determine if that device should or should not receive a particular application. For example, authentication server 110 may authenticate a particular application and determine if the application should be downloaded to a network device in communication system 100. This feature could be used to prevent introduction of viruses or other unauthorized software onto the network. Additionally, authentication server 110 may also determine if a network device within communication system 100 has proper authorization to download an application.

Network device 106 facilitates communication between a network monitor server (NMS) 116 and other network nodes and processes within communication system 100. Traditionally, an NMS will send network commands to the network devices and, in return, receive input from the network devices, including network parameters. This traditional approach to network management requires NMS 116 to perform a majority of the processing for network management. In contrast, system 100 distributes processing to the network devices that are in communication with the network. This reduces the processing load and frees up NMS 116 so that it can process more critical tasks. For example, network device 102 may monitor network traffic between it and network 111 to reduce the processing load on NMS server 116. In such a case, NMS 116 might receive a notification from network device 102 when device 102 detects that the network bandwidth has exceeded a predetermined threshold.

Target network device 112 depicts an exemplary network device monitored by either a user or central NMS 116. The client node user interface 114 allows the user to perform network management tasks that execute directly on target network device 112. NMS 116 is used to monitor larger and more frequent management tasks dealing with groups of network devices or the overall network. For example, NMS server 116 can execute software agents on different network devices and monitor overall traffic being processed by a group of network devices connected to the network.

Figure 2:
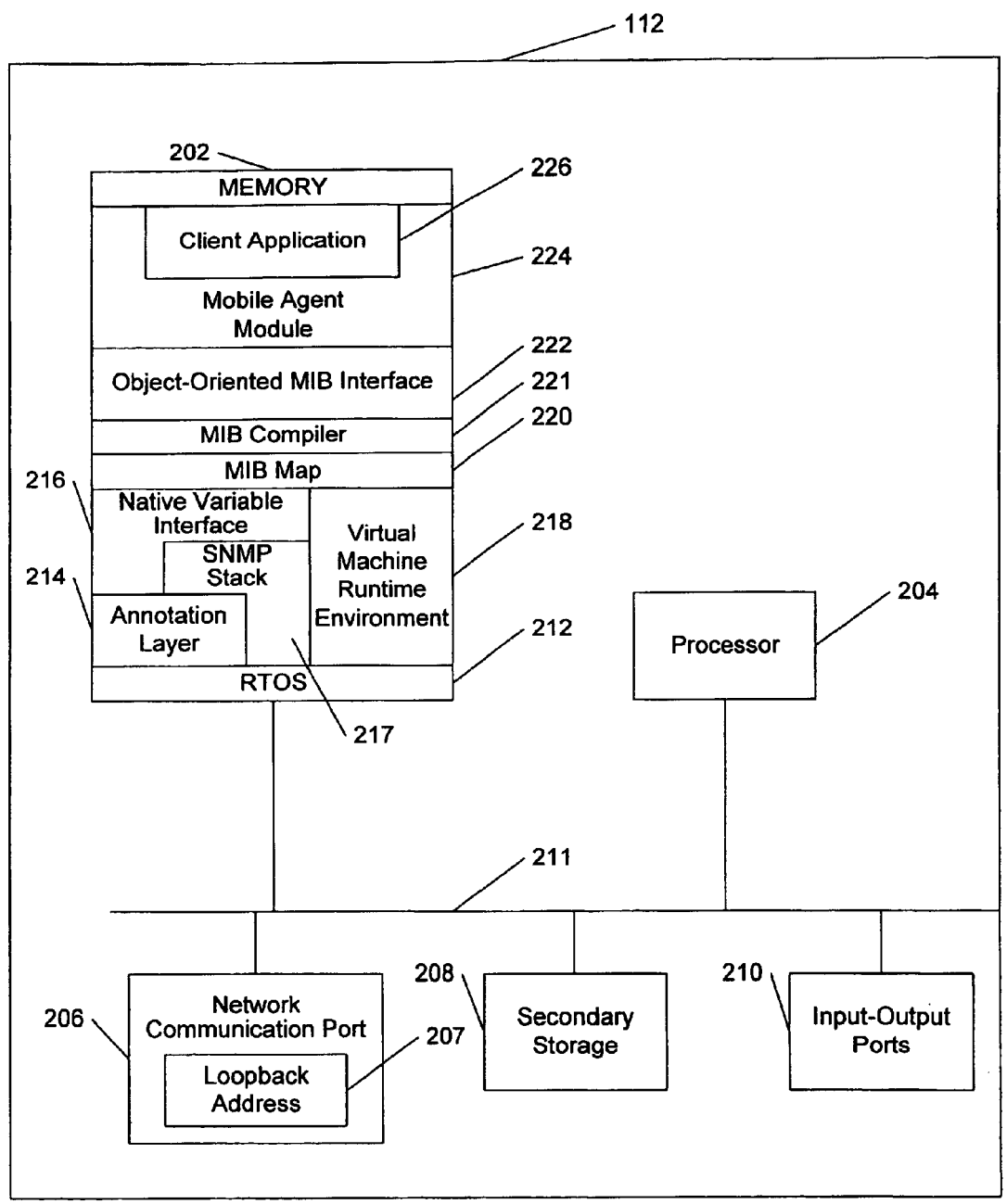
FIG. 2 is a block diagram of a network device architecture.

FIG. 2 one architecture of the network management system used on network device 112. In this example, target network device 112 includes a memory 202, a processor 204, a network communication port 206, a secondary storage 208, and input-output ports 210 in communication with each other over a bus 211.

Network communication port 206 is compatible with a variety of physical and logical network protocols including, for example, TCP/IP and Novell NetWare. A loop back address 207 enables network management applications executing on target device 112 to access local storage areas and resources using the local network protocol stack and local network parameters rather than accessing the storage area on the network device directly. By using the network protocol stack, network applications can access network parameters on a local device and a remote device in a uniform manner. For example, a network management application executing on target network device 112 can access network parameters associated with a remote network device or a local network device through network communication port 206 by specifying either the network address of the remote network device or the local device respectively. Specifically, the network management application executing on the local device can access network parameters of the local network device by specifying loop back address 207. In effect, loop back address 207 provides indirect access to the network parameters of the local device through the network protocol stack.

Secondary storage 208 may include a disk drive, CD-ROM, or any other storage device used by target network device 112. Input-output ports 210 include physical connections for terminals, printers, pointing devices, keyboards, or any other device useful in operating target network device 112.

During execution, memory 202 includes a real time operating system (RTOS) 212, an annotation layer 214, a native variable interface 216, a simple network management protocol (SNMP) stack 217, a virtual machine runtime environment 218, a management information database (MIB) map 220, a MIB compiler 221, an object-oriented MIB interface 222, a mobile agent module 224, and a client application 226. On target network device 112, RTOS 212 provides improved performance by executing instructions as they arrive without interruption or delay. A general-purpose operating system may be used in lieu of RTOS 212 but may reduce performance of target network device 112 as processes are preempted and swapped out of memory.

Annotation layer 214 provides an interface between applications accessing the MIB database associated with a network device and the actual storage locations for the MIB database on the network device. This layer is necessary because different hardware devices tend to store the underlying MIB database information in different locations on the network device. For example, one network device may store port speed address in a central lookup table of RAM while other network devices may store the port speed addresses for each port on separate ASIC chips associated with each port. Using annotation layer 214 an application can request MIB database information without specifying the actual location of data on the network device.

SNMP stack 217 implements a network management protocol used by different networks to exchange network management information while monitoring network communication. Typically, SNMP stack 217 exchanges network information with other nodes on the network through messages called protocol data units (PDUs). The PDUs contain variables with titles and values and are generally capable of "getting" network parameters, "setting" network parameters, or "testing" for network events occurring on network devices. For example, SNMP stack 217 may transmits a PDU to a remote network device to determine if the remote device has a terminal attached to it. If the terminal is attached to the remote network device, SNMP stack 217 will receive back a PDU containing information that may identify and describe the specific terminal. Each PDU typically includes a variable title, the data-type of the variable (e.g., integer, string etc.), whether the variable is read-only or read-write, and a value of the variable.

Native variable interface 216 provides direct access to underlying SNMP data stored on a network device. Each device on the network requires a different native variable interface 216 customized to the specific features of the device hardware and software. As new network devices are produced or added to a network, a new interface 216 is customized to the specific hardware and software requirements. While this customization process increases the research and development costs, it also increases the efficiency associated with retrieving network parameters from a network device because the information is accessed directly.

Alternatively, network parameters may also be retrieved using SNMP stack 217 and loopback address 207. This eliminates the need for native variable interface 216 and reduces the corresponding costs associated with developing the native variable interface. In lieu of accessing the network parameters directly, a network management application submits requests to loopback address 207 of a network device. Within the requests are SNMP compatible commands formulated to retrieve the desired network parameters. Local processes on the network device monitoring loopback address 207 pass the request to SNMP stack 217 which, in turn, accesses the network parameters as requested. The same local processes then return the resulting network parameters back through SNMP stack 217 and through loopback address 207 and back to the network management application requesting the information.

Virtual machine runtime environment 218 processes object-oriented instructions for execution on processor 204, and may include a virtual machine (VM) and a corresponding development kit (DK) having object-oriented class libraries. The VM simulates a processor and executes on many different hardware platforms. Instructions from a variety of applications are interpreted by the VM and executed on processor 204. One virtual machine run time environment 218 includes a Java virtual machine (JVM) and the Java foundation classes. The Java virtual machine is one type of virtual machine that promotes platform independent computing using the Java programming language.

In operation, MIB map 220 facilitates converting object-oriented requests for MIB information into requests for network parameters either through SNMP stack 217 or native variable interface 216. MIB map 220 determines how network parameters in a MIB should be accessed for different types of network devices. For example, MIB map 220 can be implemented with a table that converts requests for network parameters through native variable interface 216 or SNMP stack 217 into a series of object-oriented method calls. The map includes a database listing the network parameters related to the management of a network device and a set of object-oriented methods for manipulating the network parameters. MIB map 220 maps requests for network parameters from a set of operations to access and manipulate the network parameters to a database having the actual network parameter information. Each request for a network parameter may invoke one or more object-oriented methods depending on the complexity associated with retrieving and processing the data.

If a new type of network device is added to the network, MIB map 220 will initially access the network parameters using SNMP stack 217 and loopback address 207 in the manner previously discussed. This allows a network management device to access network parameters on an SNMP compatible network device using existing SNMP features built into the network device. Once a native variable interface 216 is developed for the network device, MIB map 220 can be reconfigured to access network parameters through the faster and more efficient native variable interface 216.

Object-oriented MIB interface 222 provides an interface for applications to access MIB information using object-oriented classes and methods. Initially, a MIB compiler 221, discussed in further detail below, receives a list of MIB variables and generates the classes and method found in the object-oriented MIB interface 222. At least two types of variables—scalar variables and table variables—are accessible through object-oriented MIB interface 222. A scalar variable is a single variable with an identifier that identifies the variable and a value associated with the variable. If an application requests a scalar variable, object oriented MIB interface 222 returns an object-oriented instance of that scalar variable. For example, a network management application may request a scalar variable identifying the number of resent packets on the network device. Alternatively, object-oriented MIB interface 222 may request a table of information from the underlying SNMP layer. In response, the underlying SNMP layer would provide an object table and corresponding methods for accessing each of the entries within the table. As an example, one type of object table may include a list of network addresses associated with network devices in a subnet and methods for an application to manipulate the entries in such a table.

Mobile agent module 224 provides a framework for executing a variety of mobile agents. Client application 226 represents one such mobile agent application as illustrated in FIG. 2. Accordingly, mobile agent module 224 interfaces between the mobile agent and the underlying execution environment, thus allowing a mobile agent to operate on a variety of network devices and operating environments.

For example, mobile agent module 224 implemented in accordance with the Java Bean™ application programming interface defines a portable, platform-mutual set of APIs for software components to communicate with each other in accordance with the Java Beans conventions. In addition, mobile agents implemented using Java Bean components are able to plug into other component architectures, such as Microsoft's COM/DCOM/Active X architecture. In this capacity, mobile agent module 224 acts as a bridge between mobile agents developed using Java Beans and other component object models or component architectures. For example, mobile agent module 224 may receive Java instructions from client application 226 and convert them into instructions compatible with the COM/DCOM/Active X environment or alternatively, may convert these same Java instructions into byte codes to run on a virtual machine in virtual machine run time environment 218. It should be appreciated that client application 226 may be any type of network management application designed for execution on target network device 112.

Figure 3:
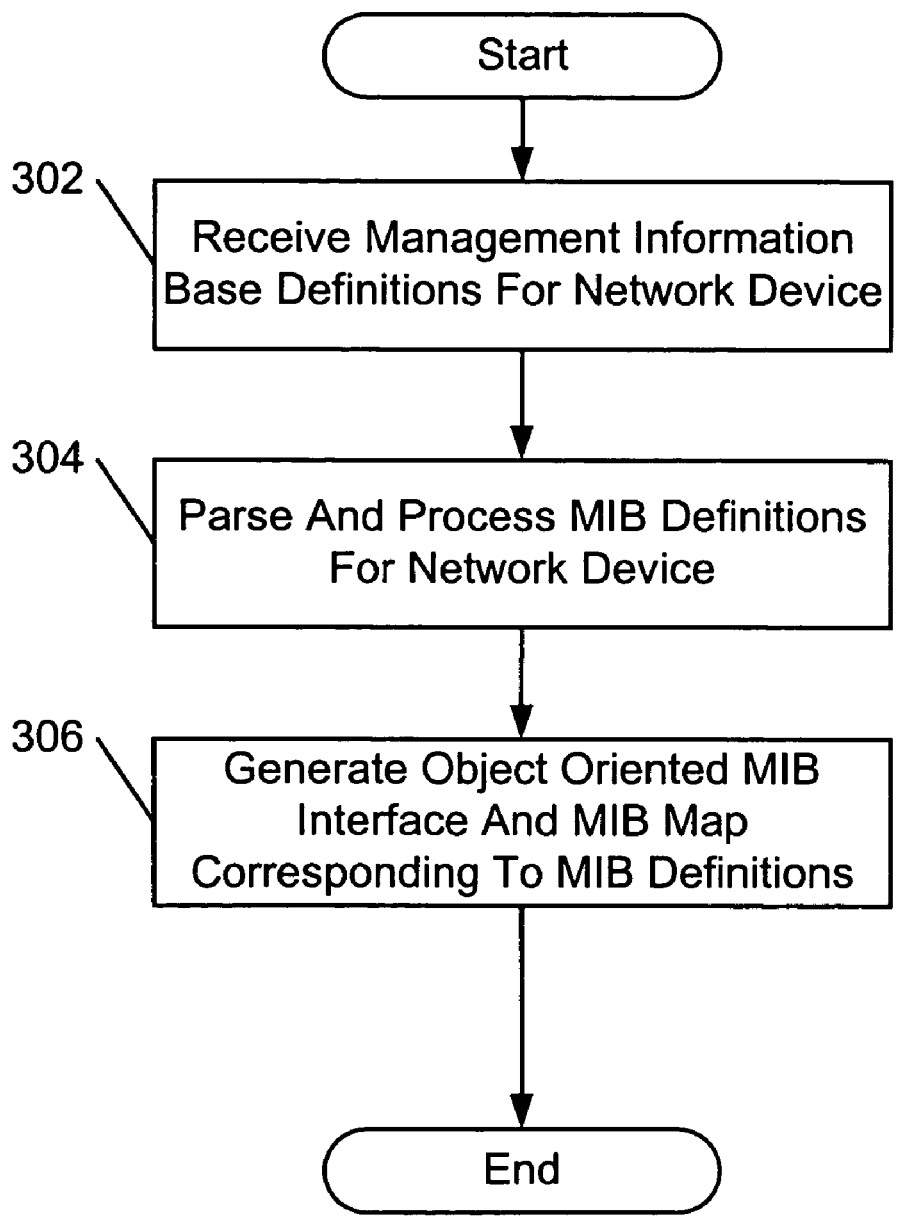
FIG. 3 illustrates the operations used to convert network parameters for a network device into an object-oriented compatible interface for accessing those network parameters.

FIG. 3 illustrates the operations for generating an interface to MIB information from an object-oriented application. MIB compiler 221 generates object-oriented MIB interface 222 and MIB map 220. Initially, MIB compiler 221 receives MIB definitions for a network device (step 302). These definitions may be stored in a database as a series of identifiers and corresponding values sufficient to describe the network parameters associated with a particular network device. Each network device may have a unique MIB definition depending on its capabilities and operating characteristics. Common MIB definitions, however, are arranged in a predetermined hierarchical order as illustrated in FIG. 4 and described below.

Next, MIB compiler 221 extracts network parameters for the specific network device from the MIB definitions (step 304). This involves lexically recognizing and parsing each token in the MIB definitions for the network device. MIB compiler 221 then generates an object-oriented MIB application programming interface or MIB interface and MIB map 220 corresponding to the MIB definitions (step 306). The object-oriented MIB interface creates classes corresponding to the MIB hierarchy and methods for accessing each of the variables in the MIB definition. MIB map 220 assists in mapping object-oriented class definitions and method calls into corresponding combinations of SNMP primitives (e.g., get, set, and test) used by SNMP stack 217.

Figure 4:
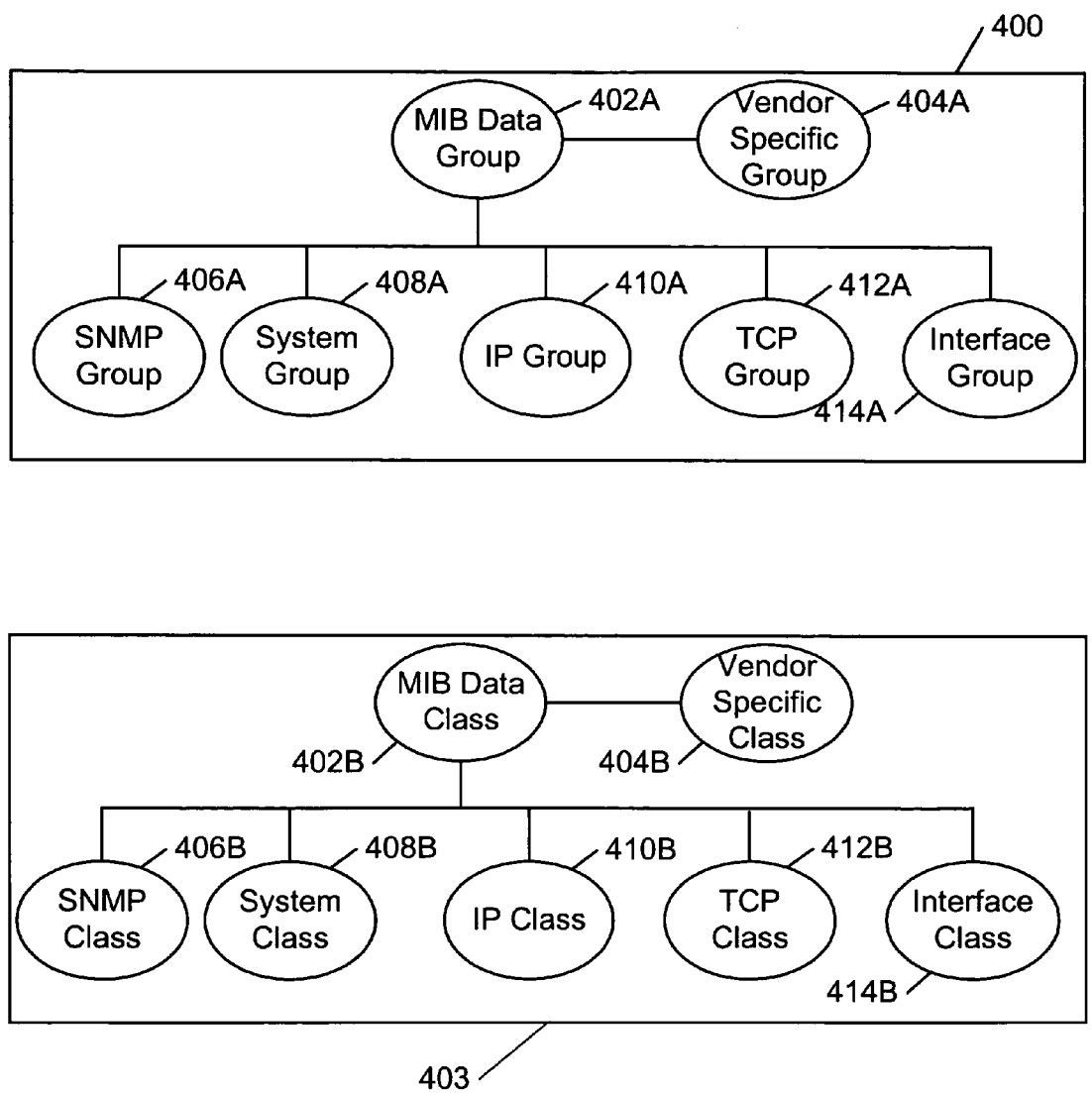
FIG. 4 depicts the relationship between a management information database (MIB) and the corresponding object-oriented MIB classes.

FIG. 4 illustrates the mapping from MIB definitions 400 to corresponding MIB classes 403 and object-oriented methods. For example, MIB definitions 400 may include a MIB data group 402A, a vendor specific group 404A, an SNMP group 406A, a system group 408A, an IP group 410A, a TCP group 412A. and an interface group 414A, to name a few. These MIB information groups define how network information is organized and can be addressed on a network device. These specific groups contain network information organized according to industry standards.

For example, vendor specific group 404A includes an area that a vendor can define their own network parameters and proprietary information. SNMP group 406A includes definitions for protocol data units (PDUs) used for network nodes to communicate. IP group 410A includes information corresponding to the network communication layer. For example, IP group 410A may include the IP address of a network device and nearby routers or switches. TCP group 412A, which includes information corresponding to the transport protocol layer, may include a list of all active connections communicating using a "socket" interface as well as the ports and corresponding services.

MIB compiler 221 in FIG. 2 receives the MIB definitions 400 in FIG. 4 in a database that lists the network parameters related to the management of a network device. MIB compiler 221 converts these MIB definitions 400 into corresponding MIB objects 403 including data class 402B, vendor's specific class 404B, SNMP class 406B, system class 408B, IP class 410B, TCP class 412B, and interface class 414B. During the conversion process, MIB compiler 221 refers to MIB map 220 in FIG. 2 to determine how the methods access network parameters in the MIB database at run time. In addition, MIB compiler 221 then creates the methods an application can use to access network parameters in the MIB database corresponding to the classes.

Figure 5:
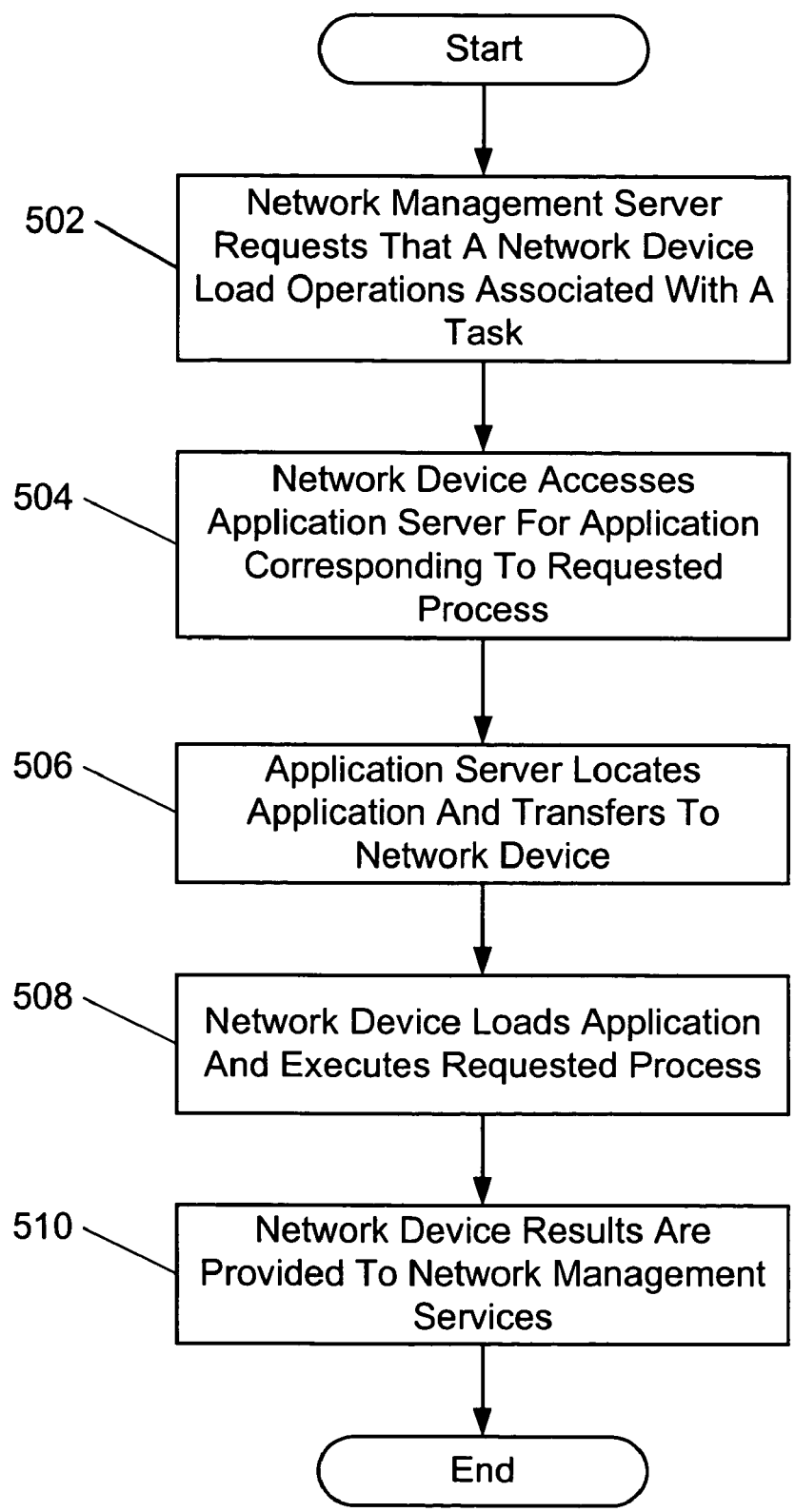
FIG. 5 illustrates the operations network management server (NMS) performs to gather network parameters from a network device.

FIG. 5 illustrates the operations used by a NMS to manage a network device. Initially, the NMS requests that a network device load a set of operations associated with a particular task (step 502). This offloads a portion of the network management processing to the target network devices and frees up the NMS to handle other requests. In addition, this reduces network traffic caused by sending numerous PDUs with SNMP messages.

In response to the request to load a set of operations, the network device accesses an application server having the application(s) capable of performing the set of operations associated with the task (step 504). For example, an application server 108 as shown in FIG. 1 stores hundreds of network applications ready for execution on target network device 112. Application server 108 receives the request, locates the application, and then transfers it to the appropriate network device (step 506). In one implementation, application server 108 transfers a network application from application server 108 to the network device each time or session the network device executes the application. Alternatively, an application may remain resident in a network device once it is initially downloaded from the application server.

The network device loads and executes the requested application (step 508). Using the application, the network device may perform a variety of network management functions. For example, the network device may be asked to monitor network traffic on a nearby network and notify the central NMS when a node on the network becomes inactive or the network traffic increases beyond a particular threshold.

Once the information or results are generated, the network device provides information back to the NMS for processing (step 510). If a central NMS is not present, the network device may broadcast results over the network to other network devices monitoring and processing the network information.

Figure 6:
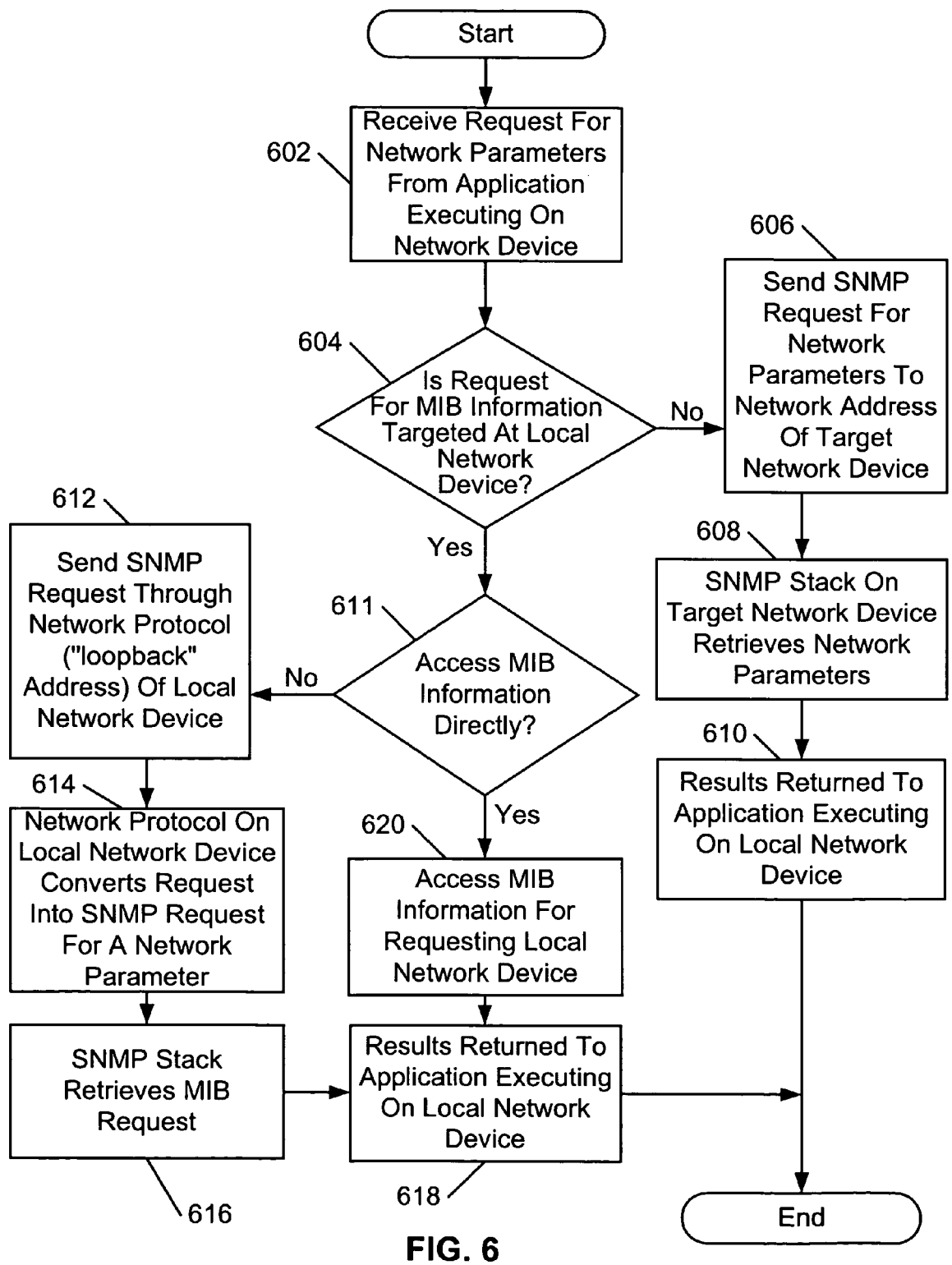
FIG. 6 illustrates the operations used by a network device to gather network parameters.

FIG. 6 illustrates the operations used to access network parameters on a network device consistent with the present invention. Specifically, a network management application executes these operations to access network parameters stored directly on a local network device or to access network parameters stored on a remote network device. By accessing network parameters on a remote device, one network device can act as a proxy for obtaining network parameters from another network device. This is particularly useful if, for example, the remote network device is an older device or otherwise incompatible with features of the present invention. For example, a network management application executing on a local network device can be used to access parameters on a remote network device designed without a virtual machine or that is not capable of executing network management applications designed consistent with the present invention. The network management application can be an object-oriented application written in Java that uses remote method invocation (RMI), JINI, COM/DCOM or other distributed computing mechanisms to process information on a remote computer system. Java, RMI, JINI and derivatives of Java are trademarks of Sun Microsystems, Inc. of Mountain View, Calif. COM/DCOM are products developed by Microsoft of Redmond, Wash.

As shown in FIG. 6, a network management application initially begins execution on a local network device. The network management application executing on the local network device requests a network parameter typically found in the MIB (step 602). For example, a network management application may request MIB information corresponding to the current count and the cumulative count of packets being transmitted to determine if the capacity of a network device has been met or exceeded.

The network management application then determines if the requested network parameter is associated with the local network device or a remote network device (step 604). If the network parameter is associated with a remote network device, the network management application forms and sends a request for the network parameter to the remote network address of the network device (step 606). For example, the network management application may request that SNMP stack 217 (see FIG. 2) create a PDU to gather MIB information on the remote device. This request can be formed using an object-oriented programming language such as Java. SNMP stack 217 then transmits the request for a network parameter over the network to the remote network device for processing. A network protocol such as TCP/IP associated with that remote network device receives the request for the network parameter. The SNMP stack on the remote device processes the request and retrieves the requested network parameter, which includes MIB information (step 608). Once the network parameter is received on a remote network device, the corresponding SNMP stack packages the result into a PDU and sends the results back to SNMP stack 217 for processing by the network application executing on a local network device (step 610).

If the network management application requests network information associated with the local network device (step 604), the network management application can access the requested network parameters in at least two different ways. The network management application can access the network parameters on the local network device directly (step 611) using a software interface customized for the network device (step 620). For example, the network management application can use a native variable interface to access network parameters on the local network device.

Alternatively, the network management application may access local network parameters on a local network device using existing network protocol. Initially, the network management application sends a request for a network parameter through the network protocol of the local network device using the "loopback" address (step 612). This loopback address is a self-referential address which identifies the local network device on the network without sending packets of information over the actual network. For example, sending a request to the loop back address establishes a data route directly back to the network protocol stack on the local network device. The network management application essentially uses SNMP stack 217 on the local network device to create a PDU to request the corresponding network parameter (step 614). SNMP stack 217 then retrieves the requests for the particular network parameter (step 616). The results, are then returned to network management application 226 executing on local network device (step 618).

While specific implementations have been described herein for purposes of illustration, various modifications may be made without departing from the spirit and scope of the invention. For example, although aspects of the present invention are described as being stored in memory and other storage mediums, they can also be stored on or read from other types of computer-readable media, such as secondary storage devices, like hard disks, floppy disks, or CD-ROM, a carrier wave from the Internet, or other forms of RAM or ROM. Accordingly, the invention is not limited to the above-described embodiments, but instead is defined by the appended claims and their full scope of equivalents.

What is claimed is:

1. A system for managing network resources comprising:
 a network management server configured to execute a network management application which causes the network management server to perform network management instructions including,
 sending one or more network commands to one or more network devices connected to a network causing reconfiguration of how the one or more network devices process network traffic,
 receiving one or more status packets from the one more network devices in response to the one or more network commands, and
 performing an analysis of use of network resources on the one or more network devices connected to a network using the one or more status packets, the network management server further configured to request that a network device load the network management application from another device, the network device being among the one or more network devices; and
 a network device configured to download the network management application and execute the network management application which causes the network device to perform the network management instructions including,
 reconfiguring how network traffic is processed,
 sending one or more second network commands to one of the one or more network devices,
 receiving one or more second status packets from one of the one more network devices in response to the one or more second network commands,
 performing an analysis of use of network resources on the one or more network devices connected to a network using the one or more second status packets, and
 sending results of the analysis to the network management server for use in management of the network.

2. The system in claim 1, wherein the task network management application includes network management instructions compatible with a network management protocol.

3. The system in claim 2, wherein the network management protocol includes the simple network management protocol (SNMP).

4. The system in claim 1, wherein the task network management application includes network management instructions compatible with an object-oriented programming language.

5. The system in claim 1, wherein the task network management application includes network management instructions compatible with byte-codes executable on a virtual machine.

6. The system in claim 5, wherein the virtual machine is compatible with the Java Virtual Machine.

7. The system in claim 1, wherein the task network management application includes network management instructions compatible with the Java object-oriented programming language.

8. The system in claim 1, further comprising an application server device connected to the network and used to store one or more network management applications downloadable onto the network device.

9. The system in claim 1, wherein the task network monitors a network parameter associated with the network and notifies the network management server when the network parameter reaches a threshold level.

10. The system in claim 1, wherein the network device performing an analysis of use of network resources on the one or more network devices connected to a network reduces processing load on the network management server and frees up the network management server to perform tasks other than performing an analysis of use of network resources.

11. A computer-implemented method of distributing management of network resources on a network to network devices exchanging information over the network, comprising:
 executing a network management application through a network management server to perform network management instructions including an analysis of use of network resources on one or more network devices connected to a network;

receiving a request on a network device among the one or more network devices to execute the network management application including reconfiguring how one or more of the network devices processes network traffic and performing an analysis of use of network resources on one or more other network devices connected to the network;

receiving the network management application at the network device from another network device over the network wherein the network management application includes the network management instructions for reconfiguring the network device and performing the analysis task;

reconfiguring the network device;

processing the network management instructions on the network device that requests a network parameter from a remote network device, the remote network device being among the one or more other network devices, the network management instructions including;

transmitting the request for the network parameter over the network to the remote network; and receiving the requested network parameter over the network from the remote network device, processing the network management instructions including performing the analysis on the network device using the network parameter; and providing results of the analysis to the network management server in response to the request to execute the task.

12. The method in claim 11, wherein providing results further comprises:

notifying a the network management server when the network parameter reaches a threshold level.

13. The method in claim 11 wherein the task network management application includes network management instructions compatible with a network management protocol.

14. The method in claim 13 wherein the network management protocol includes the simple network management protocol (SNMP).

15. The method in claim 11, wherein the task network management application includes network management instructions compatible with an object-oriented programming language.

16. The method in claim 11, wherein the task network management application includes network management instructions compatible with byte-codes executable on a virtual machine.

17. The method in claim 15, wherein the virtual machine is compatible with the Java Virtual Machine.

18. The method in claim 11, wherein the task network management application includes network management instructions compatible with the Java object-oriented programming language.

19. The method in claim 11, wherein the a processor on the network device executes a network management instruction that analyzes the utilization of network resources on one or more network devices connected to the network.

20. The method in claim 11, further comprising an application server device connected to the network, the application server device being used to store one or more network management applications that are downloadable onto the network device.

21. The method in claim 11, wherein processing the network management instructions on the network device reduces processing load on the network management server and frees up the network management server to perform tasks other than performing an analysis of use of network resources.

22. An apparatus for distributing network management of a network to network devices, comprising:

a network management server configured to execute a network management application which causes the network management server to perform network management instructions including, sending one or more network commands to one or more network devices connected to a network, receiving one or more status packets from the one more network devices in response to the one or more network commands, and performing an analysis of use of network resources on the one or more network devices connected to a network using the one or more status packets, the network management server further configured to request that a network device load the network management application from another device, the network device being among the one or more network devices; and a processor; and a memory containing instructions when executed cause the processor to, receive the request on the network device to execute the network management application that performs the network management instructions receive the network management application over the network on the network device wherein the network management application has the instructions for performing the network management instructions including, reconfiguring how the network devices processes network traffic, requesting network parameters from a remote network device, the remote network device being among the one or more network devices, transmitting the request for the network parameter over the network to the remote network, receiving the requested network parameter over the network from the remote network device, processing the instruction for performing the analysis on the remote network device using the network parameter; and providing results of the analysis to the network management server in response to the request to execute the network management instructions.

23. The apparatus of claim 22 wherein the memory contains additional instructions for execution on the processor that continue processing network management instructions on the network device using the network parameter, and providing and provide results of the analysis in response to the request to execute the task.

24. The apparatus of claim 22 wherein the memory contains additional instructions for execution on the processor and providing results of the analysis that further notify the network management server when the network parameter reaches a threshold level.

25. The apparatus of claim 22 wherein the processor executes network management instructions compatible with a network management protocol.

26. The apparatus of claim 25 wherein the network management protocol includes the simple network management protocol (SNMP).

27. The apparatus of claim 22, wherein the processor executes network management instructions compatible with an object-oriented programming language.

28. The apparatus of claim 22, wherein the processor executes network management instructions compatible with byte-codes executable on a virtual machine.

29. The apparatus of claim 28, wherein the virtual machine is compatible with the Java Virtual Machine.

30. The apparatus of claim 22, wherein the processor executes network management instructions compatible with the Java object-oriented programming language.

31. An apparatus for distributing network management of a network to network devices exchanging information over the network comprising:
   means for executing a network management application through a network management server to perform network management instructions including an analysis of use of network resources on one or more network devices connected to a network:
   means for receiving a request on a network device among the one or more other network devices to execute the network management application including reconfiguring how the network devices processes network traffic and performing an analysis of use of network resources on one or more other network devices connected to the network;
   means for receiving, from another network device, the network management application at the network device over the network wherein the network management application includes the network management instructions for performing the analysis task;
   means for processing the network management instructions on the network device that requests network parameters from a remote network device, the remote network device being among the one or more other network devices, the network management instructions including,
   means for transmitting the request for the network parameter over the network to the remote network; and
   means for receiving the requested network parameter from the remote network device over the network,
   means for processing the network management instructions including reconfiguring how the network devices processes network traffic and performing the analysis on the network device using the network parameter; and
   means for providing results of the analysis to the network management server in response to the request to execute the task.

32. A computer program product embodied in a computer-storage medium, for distributing network management of a network to network devices exchanging information over the network, the product comprising program code instructions to cause a processor to:
   execute a network management application through a network management server to perform network management instructions including an analysis of use of network resources on one or more network devices connected to a network,
   receive a request on a network device among the one or more network devices to execute the network management application including reconfiguring how the network devices processes network traffic and performing an analysis of use of network resources on one or more other network devices connected to the network;
   receive, from another network device, a network management application at the network device over the network wherein the network management application includes the network management instructions for performing the analysis task;
   process the network management instructions on the network device that requests network parameters from a remote network device, the remote network device being among the one or more other network devices, the network management instructions including instructions to cause the processor to
   transmit the request for the network parameter over the network to the remote network; and
   receive from the remote network device the requested network parameter over the network
   process the network management instructions including reconfiguring how the network devices processes network traffic and performing the analysis
   on the network device using the network parameter; and
   provide results of the analysis to the network management server in response to the request to execute the task.

* * * * *